INVENTORS.
ROBERT M. HUTCHINSON
DANIEL S. HOAG
BY Arthur H. Swanson
ATTORNEY.

United States Patent Office 3,322,616
Patented May 30, 1967

3,322,616
PULP DIGESTER CONTROL APPARATUS
Robert M. Hutchinson, Havertown, and Daniel S. Hoag, Lionville, Pa., assignors to Honeywell Inc., a corporation of Delaware
Filed July 12, 1963, Ser. No. 294,582
6 Claims. (Cl. 162—238)

This invention relates to digesters for producing paper pulp from raw materials such as cellulosic chips.

More specifically, the present invention relates to the operation of continuous degister processes.

An object of the present invention is to provide an improved automatic control system for operating a continuous digester process.

Another object of the present invention is to provide an automatic control system for a continuous digester process utilizing analog computer techniques.

A further object of the present invention is to provide a process computer for controlling a continuous digester process to achieve economic operation and the ability to produce paper pulp of predetermined quality and quantity.

A still further object of the present invention is to provide a process computer for monitoring and controlling a continuous digester process according to a predetermined program.

Another further object of the present invention is to provide a process control computer for a continuous digester, as set forth herein, having an accurate operation and a simple construction.

In accomplishing these and other objects, there has been provided, in accordance with the present invention, a process control computer for a continuous digester having analog computing circuits for solving a process equation representative of the operation of an operating continuous digester. The computing circuits operate on process signals representative of current or future digester conditions and output product pulp characteristics. The computer is effective to continuously compute a set-point temperature signal to control the cooking temperature of the digestion process to produce the desired continuous digester output product. A control panel of the computer is arranged to provide an indication of the status of the computer while providing means for programming a future operation of the digester.

A better understanding of the present invention may be had when the following detailed description is read in connection with the accompanying drawings, in which.

Figure 1:
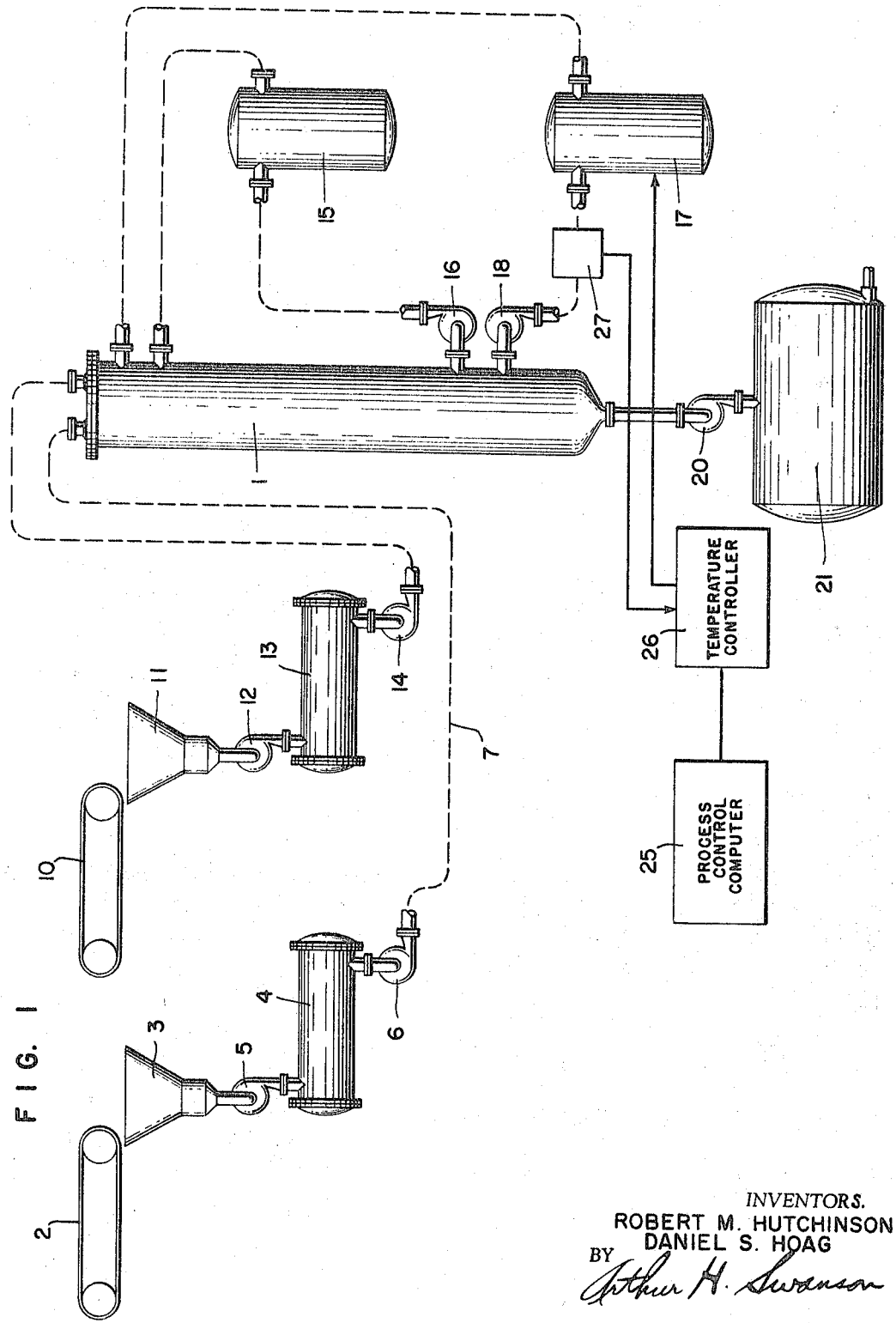
FIG. 1 is a pictorial view of a continuous digester process apparatus embodying the present invention.

Referring to FIG. 1 is more detail, there is shown a pictorial representation of a digester apparatus using a continuous digester 1. The digester 1 is supplied with chips of a cellulosic material; e.g., wood, by means of any desirable input system which may typically comprise a conveyor 2, a chip hopper 3 and a steaming vessel 4. The chips in the hopper 3 are fed into the steaming vessel 4 by a low pressure feeder 5. The chips are steamed in the vessel 4 to heat them and to remove by-products; e.g., turpentine. They are subsequently fed by a high pressure feeder 6 into the upper end of the upright digester 1 through pipeline 7.

A second chip supply system may be provided for supplying chips of a different cellulosic material whereby the composition of the digested cellulosic material may be varied. The second chip supply system may also be provided for increasing capacity of the digester. Thus, a second conveyor 10, a second hopper 11, a second low pressure pump 12 and a second steaming vessel 13 are arranged to comprise a second source of chips.

The chips form the second vessel 13 are fed into the digester 1 by a second high pressure pump 14. The digester 1 is also supplied with an alkaline liquid used to decompose the chips to remove undesired constituents such as lignin. This liquid, or cooking liquor, is fed into the top of the digester 1 and is also used to carry the chips into the digester 1. The liquor is used to heat the contents of the digester 1 by circulating the liquor through heat exchanger 15. A pump 16 is used to supply the pressure for pumping the liquor through the heat exchanger 15. A second heat exchanger 17 is used to withdraw liquor from a second portion of the digester by means of second liquor pump 18. The heated liquor from the heat exchanger 17 is also returned to the digester 1. The end-product from the digester 1 is withdrawn at the bottom of the digester 1 and is transferred by an outlet device 20 into a process vessel 21 known as a brown stock, or blow tank. From here the digested pulp is taken through further manufacturing process to produce the desired paper stock.

A process control computer 25 is used to control the set-point temperature of a temperature controller 26. The controller 26 is arranged to sense the temperature of the circulated liquor for the lower portion of the digester 1, which liquor is heated by the heat exchanger 17. The temperature is sensed by a temperature sensitive element 27 mounted on the lower liquor circulation line. The output of the controller 26 is used to control the operation of the heat exchanger 17 to maintain the temperature of the liquor at the set-point temperature.

The digester 1 is provided with two heating zones identified as the upper heating zone and the lower heating zone. The upper zone is arranged to operate at a relatively low liquor temperature to raise the temperature of the chip mass with heated liquor while initiating a negligible measure of the desired chemical reaction. The lower zone is arranged to operate at a high liquor temperature to induce an appreciable chemical reaction in the chip mass. From the lower heating zone, the chip and liquor mixture desends to the cooking zone in an insulated lower portion of the digester 1. The temperature of the liquor and chip mass entering the cooking zone is held constant by the controller 26. To insure that the measured liquor temperature is representative of the internal digester temperature, the flow of liquor through the heat exchanger 17 is maintained at a rate several times that of the rate of the movement of the chip and liquor mass down through the digester 1. The chemical reaction induced by the liquor is dependent primarily on the liquor properties (active alkali content), ratio of active alkali to wood chips being cooked, circulating liquor temperature and the time allowed for the chips to travel through the cooking zone. In the normal operating practice of a continuous digester, the liquor properties and ratio of alkali to chips are held constant. Since the temperature of the liquor is controlled at a set-point temperature by the controller 26, the time of the reaction is the controlling variable in the digestion process. Thus, the extent of the desired chemical reaction between the cooking liquor and the chips is dependent on the time spent by the chip in the cooking zone before it is withdrawn at the bottom of the digester 1. The computer 25 is arranged to control this chemical reaction by computing the time spent in the cooking zone and, from this computed time and other process variables, maintaining a computed set-point temperature of the liquor in the lower heating zone.

The quality of the digested material is determined by the percentage of lignin removed from the chips. This lignin removal, or delignification, is performed by the aforesaid chemical reaction and is, accordingly, dependent on the factors determinative of the reaction rate. The quality of the end-product pulp removed from the digested is measured by a standard test used in the pulp and paper industry, known as a Permanganate Number Test (K No.). This test gives a measure of the percentage of lignin remaining in the pulp after cooking. Thus, for a wood chip feed of known lignin content, the K number of the pulp gives a measure of the degree of chemical reaction which has taken place in the cooking process.

Figure 2:
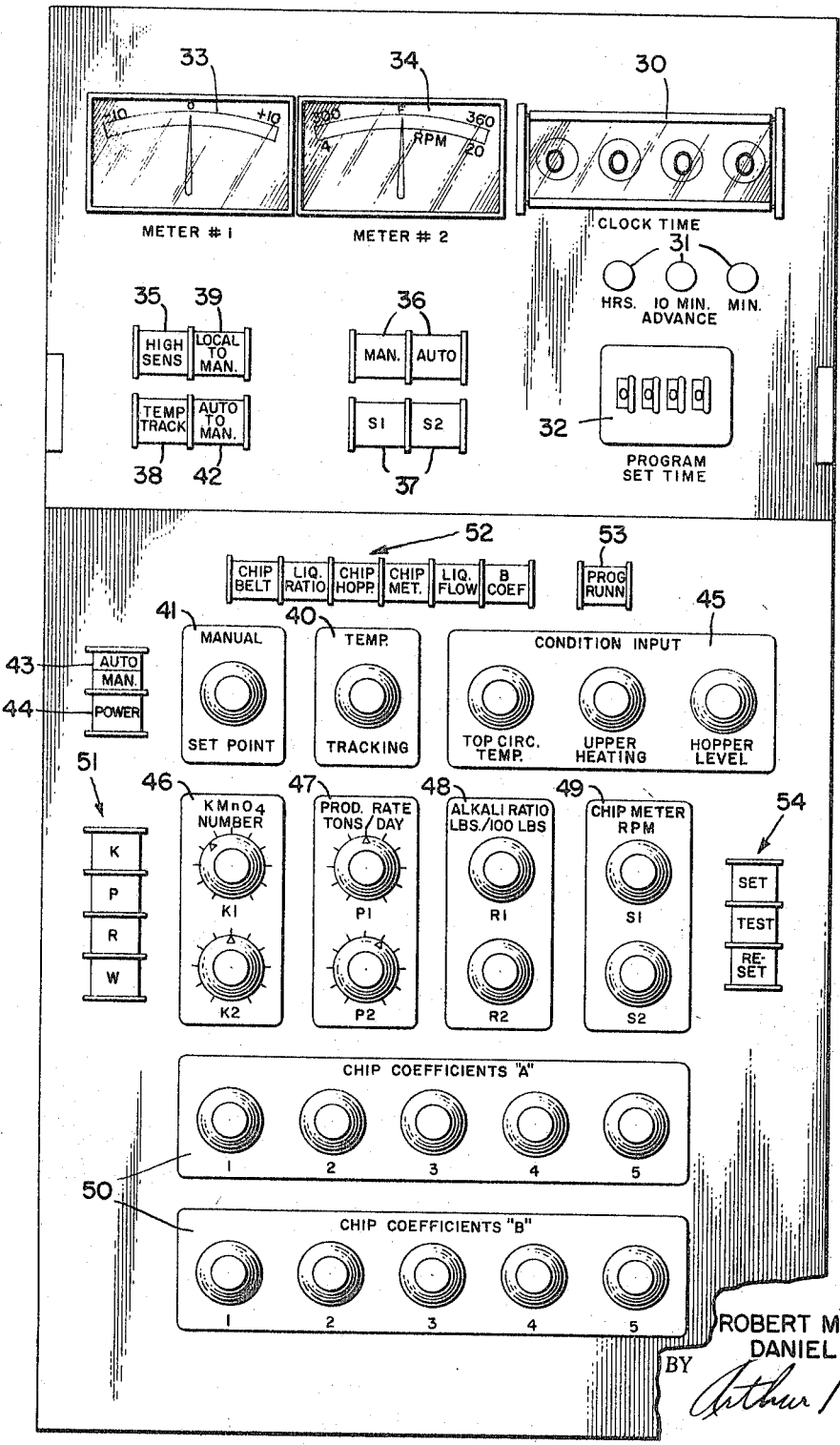
FIG. 2 is a pictorial view of a control panel for a process control computer for use with the process apparatus shown in FIG. 1.

In FIG. 2, there is shown a control panel for the computer 25. This control panel is used to adjust the computing circuitry and to provide an indication to an operator of the status of the computer control. A clock mechanism 30 provides a visual and electrical indication of actual time. Adjustment buttons 31 are located beneath the clock 30 for correcting the time indication. A plurality of thumb wheels 32 are used to provide a signal to the process computer which signal defines the future program time when change is to be made in the operation of the digester process. This change may be a change in K number, production rate, type of chips supplied, or the like.

A pair of meters 33 and 34 are provided to enable the operator to make adjustments to the computer to provide a computed control program which will provide the end-product desired. A push-button 35 is provided to change the sensitivity of the meter 33. Indicator lights 36 and 37 are provided to indicate the type of control in use; i.e., manual or automatic computer, and the designation of the indication on meter 34, respectively. A temperature tracking switch button 38 is provided to connect the meter 33 as a read-out of the error between the existing set-point temperature of liquor under conventional control and the calculated computer set-point temperature. A switch button 39 is used to connect the set-point temperature in use with the meter 33 for a possible correction by the operator. A potentiometer adjustment is provided for eliminating the temperature error, or temperature tracking, by means of tracking knob 40. A manual set-point knob 41 is used to manually adjust the temperature set-point for the temperature controller 26.

An automatic to manual button 42 is provided for checking the computed set-point with the set-point appearing on set-point knob 41. An automatic to manual button 43 is provided to transfer the operation of the computer while a power button 44 is used to turn on the power to the computer. The input signals to the computer are entered by manually adjustable potentiometers. The constants, or known process conditions, are entered by a set of condition potentiometers 45. The present and future signals for converting between an existing operation and a future desired operation are entred on a plurality of paired potentiometers. Respective ones of each pair of potentiometers represent a present and future program value for the associated variable. Thus, the permanganate, or K, number is entered by K potentiometers 46. Similarly, the production rate is entered by a production potentiometer pair 47.

The relative amount of the cooking liquor is entered by an alkali ratio pair 48, and the chip rate by a chip meter r.p.m. pair 49. The character of the chips supplied is entered by coefficient potentiometer 50. A first group of push-buttons 51 are used to indicate the entry of the K number, production rate, alkali ratio and wood coefficient, respectively. A second group of lights 52 are used to indicate operations and checks to be made by the computer operator. The operation of the computer during the time of a calculated future operation is indicated by a program run light 53. A set of push-buttons 54 are provided to allow the operator to check the suitability of a future program before the actual time has arrived for its execution, as well as providing a means to cancel a program.

The computer operates with a recognition of the following process operation characteristics.

(1) A change in flow at the input to the digester produces a change in output flow from the digester.

(2) The removal of lignin is accomplished in the cooking zone which maintains a substantially constant temperature, which temperature is determined by the temperature of the circulated liquor in the heating zones.

(3) A change in liquor composition at the input to the digester is delayed from arrival in the cooking zone by a travel and mixing period through the digester.

(4) Travel times external to the digester for chips and liquor are known and constant.

Figure 3:
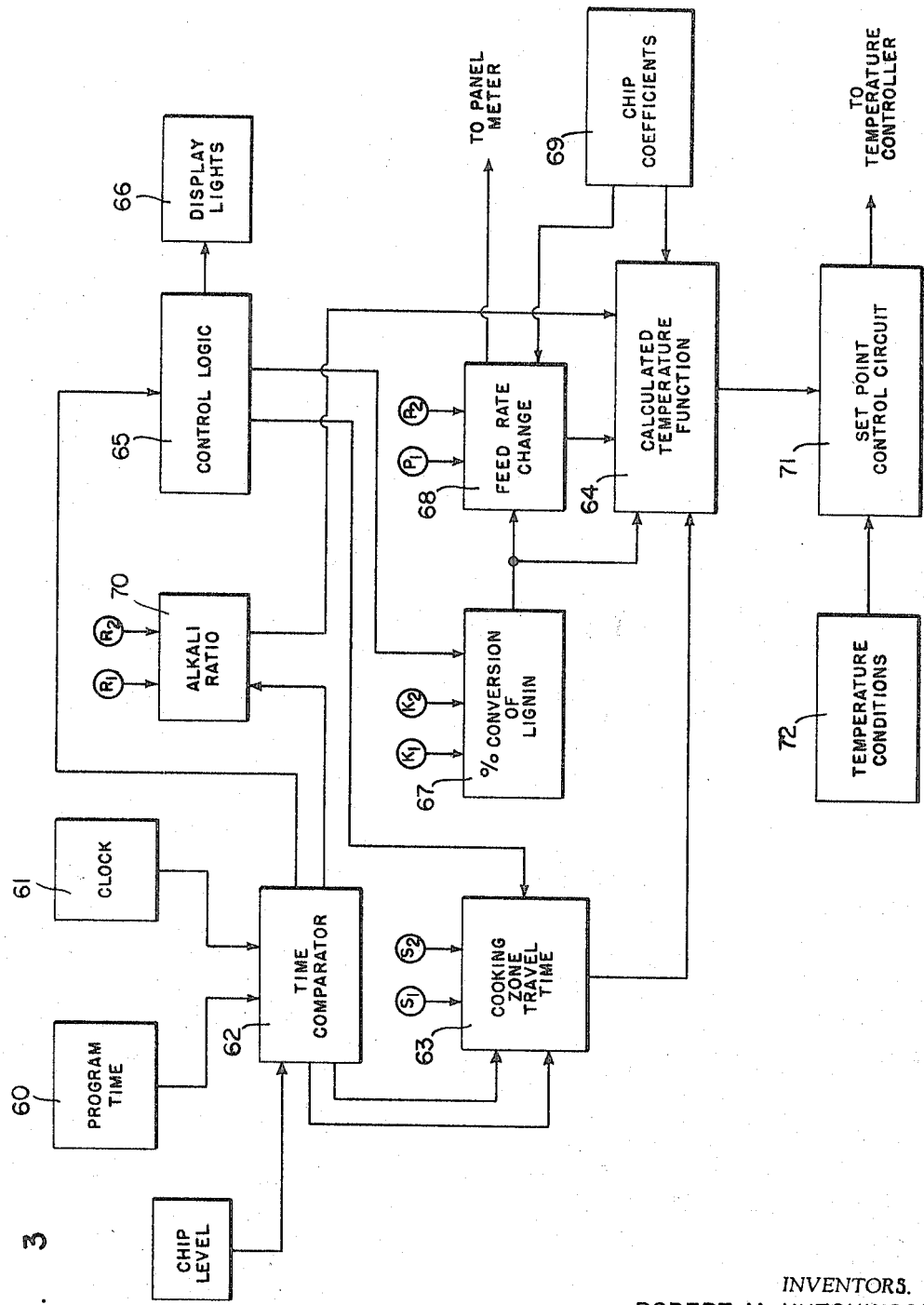
FIG. 3 is a schematic illustration of a block diagram of a process control computer for use with the process apparatus shown in FIG. 1 and also embodying the present invention.

Based on these operating characteristics and a study of the cooking process, a series of equations were discovered to improve the automatic control of a continuous digester. These equations are defined in the foregoing discussion. A block diagram of the process computer to implement these discoveries is shown in FIG. 3.

The computer calculates the feed rate and cooking temperature required to produce product pulp of a desired K number at a desired production rate with desired alkali ratio and desired wood specie. More specifically, the following equations are employed by the computer to perform these functions:

For the desired conditions and product pulp, the required degree of conversion of lignin in the wood chips is calculated from the following equation:

(1)
$$X_F = \frac{K_0 - K}{K_0 - \alpha}$$

where:

$X_F$ = Fractional conversion of lignin
$K_0$, $\alpha$ = Coefficients dependent on lignin content of wood specie and relationship of K number and lignin content
$K$ = Permanganate number of pulp desired The desired lignin conversion, $X_F$, is then used to calculate the fed rate of chips required from Equation 2

(2)
$$S = \frac{P}{d_c C_M a (1 - X_F)^b}$$

where:

$P$ = Production rate of pulp
$d_c$ = Density of wood chips in chip meter
$C_M$ = Chip meter constant
$a, b$ = Constants dependent on wood specie
$S$ = Feed rate of chips (expressed as chip feed meter speed or rate of feed of chips)

The cooking travel time $\theta_c$, for chips entering the cooking zone at any time, $t$, is calculated by the computer from one of three equations depending on the actual time relative to any desired program change time, $t_s$. These equations and when they are applicable are given in Equations 3A, 3B, and 3C below:

(3A)
$$\theta_c = \frac{V_c}{S_1}$$

when:

$$t \leq \left(t_s - \frac{V_c}{S_1}\right)$$

(3B)
$$\theta_c = (t_s - t)\left(1 - \frac{S_1}{S_2}\right) + \frac{V_c}{S_2}$$

when:

$$\left(t_s - \frac{V_c}{S_1}\right) < t < t_s$$

(3C)
$$\theta_c = \frac{V_c}{S_2}$$

when:

$t \geq t_s$ where:

$t$ = Actual time
$t_s$ = Time for programmed change in digester condition or product
$S_1$ = Current feed rate
$S_2$ = Future feed rate after change
$V_c$ = Constant dependent on digester cooking zone volume
$\theta_c$ = Cooking time for chips entering digester at time $t$ Using these computed values of cooking time, $\theta_c$, desired lignin conversion, $X_F$, desired alkali ratio, R and computed feed rate, S, the computer calculates the cooking temperature, T, which must be maintained in the cooking zone of the continuous digester. This is accomplished in a series of steps by several computing circuits in the process computer. First, a temperature function, $F_T$, is computed from the following Equation 4:

(4)
$$F_T = \frac{1}{CR\theta_c}[E \log(1-A_{X_F}) - G \log(1-X_F) + H_{X_F}]$$

where:

$\theta_c$ = Cooking time
$X_F$ = Lignin conversion
$R$ = Active alkali to wood chip ratio
$A, C, E, G, H$ = Coefficients dependent on wood specie and process A second computer circuit in the temperature control portion of the computer calculates the temperature difference, $\Delta T$, required from a standard reaction temperature, $T_S$, by the following Equation 5:

(5)
$$\Delta T = \frac{1}{B} \log F_T$$

where:

$B$ = Temperature coefficient of the delignification chemical reaction

From this computed value of $\Delta T$ and the manual inputs of other temperatures in the digester, the computer then calculates the temperature set-point for the temperature controller on the lower circulation liquor from the following Equation 6:

(6)
$$T_2 = \frac{1}{C_2}[T - C^1 T_1 - C^2 T_0 + T_S \pm T_T]$$

where:

$T$ = Value from Equation 5
$T_0$ = Temperature at top of digester
$T_1$ = Upper circulation liquor temperature set point
$T_2$ = Desired lower circulation liquor temperature controller set point
$T_S$ = Standard reaction temperature such that $F_T = 1$
$T_T$ = Temperature tracing adjustment The operation of the computer to solve these equations is illustrated in FIG. 3. The constants and desired variable levels are supplied to the computer by means of the potentiometers on the front panel and internal computer adjustments. The future program time 60 is set by thumb wheels 32 on the computer control panel, shown in FIG. 2. The clock 61 is the clock mechanism 30 on the front panel. The clock time signal and future program time signal are generated ramp signals which are compared by a comparator 62 to derive successive timing signals for controlling the computation process. The timing signals are supplied to a cooking time circuit 63 along with the chip rate from potentiometers 49. Circuit 63 is used to solve Equations 3A, 3B and 3C and to apply the solution to a temperature function circuit 64 used to solve Equations 4 and 5. The timing signals from comparator 62 are also supplied to control logic 65 for controlling a display light array 66 comprising the front panel lights such at 52. The control logic 65 is also used to sequence the calculations of the cooking time circuit 63 and a percent lignin conversion circuit 67. The K numbers for the conversion circuit 67 are supplied by Potentiometers 46 and the circuit 67 is used to solve Equation 1 The. output of circuit 67 is supplied to the function circuit 64, and to a feed rate change circuit 68. The feed rate circuit 68 is supplied with the feed rate signals from potentiometers 47 as well as the chip coefficients $(a, b)$ to solve Equation 2. The chip coefficient circuit 69 is supplied by the potentiometers 50 on the control panel.

An alkali ratio circuit 70 is used to supply a signal representative of the alkali ratio. The output signals from the feed rate circuit 68 and the alkali ratio circuit 70 are also applied to the temperature function circuit 64 along with chip coefficient signals from circuit 69. The output signal from the temperature function circuit 64, representing a solution to Equations 4 and 5, is applied to a set-point control circuit 71. The control circuit 71 is also supplied with preset process signals from a temperature conditions circuit 72. This circuit 72 is comprised of the potentiometers 40 and the two temperature condition potentiometers from potentiometers 45 on the front panel. An output signal from the control circuit 71 is applied to the temperature controller 26 (FIGURE 1) to control the liquor temperature in the lower heating zone of the digester 1.

Figure 4:
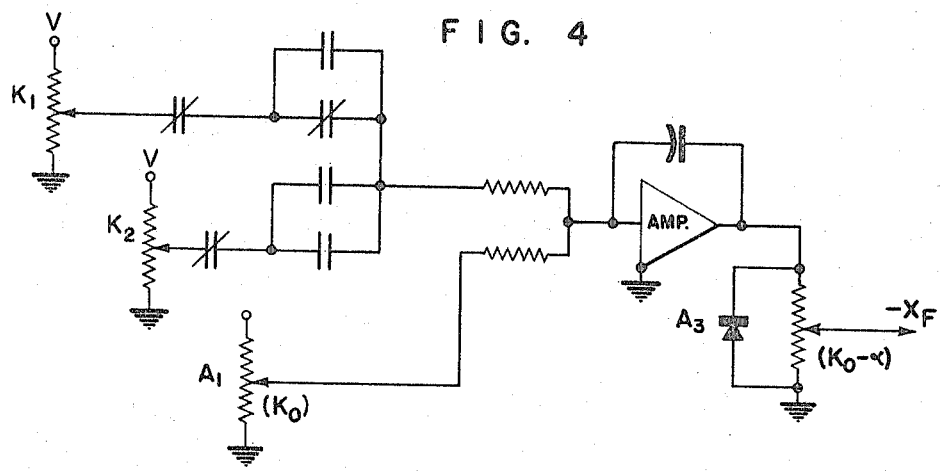
FIGS. 4 to 6 are schematic illustrations of circuits suitable for use in the control computer shown in FIG. 3.

Suitable circuits for performing the computing functions, described above, are shown in FIGS. 4 to 6. FIG. 4 is a circuit for solving for $-X_F$ with the relay contacts used to introduce $K_2$ values and remove $K_1$ values at appropriate times in the computing operation. The signals for operating the relay contacts are derived from a plurality of timing circuits which produces signals in a timing sequence by comparing the ramp signals from the clock and program timer with reference levels. Thus, a series of spaced time signals are produced with each timing circuit operating independently.

Figure 5:
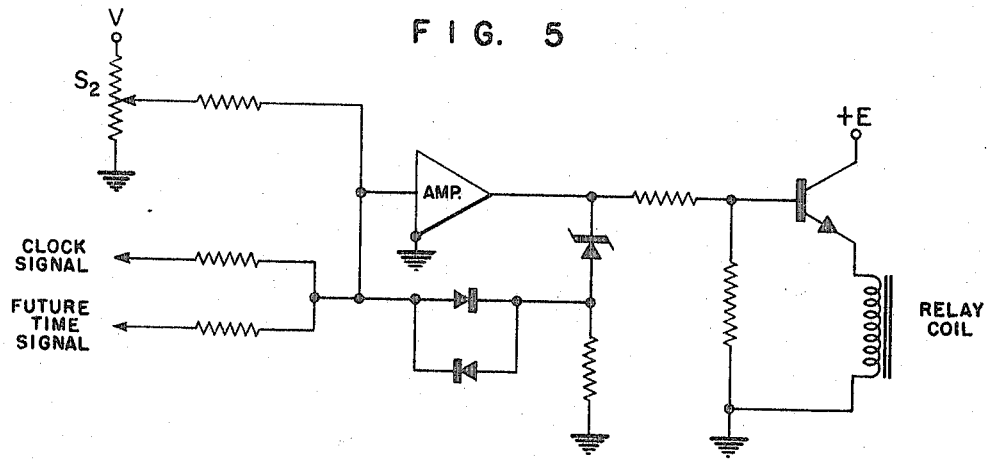

A representative timing circuit is shown in FIG. 5. This circuit is arranged to produce a relay operation when the new chips are entering the cooking zone. The relay contacts are arranged to affect the computing operation of the percent lignin conversion as well as controlling the meter and light indications on the front panel.

Figure 6:
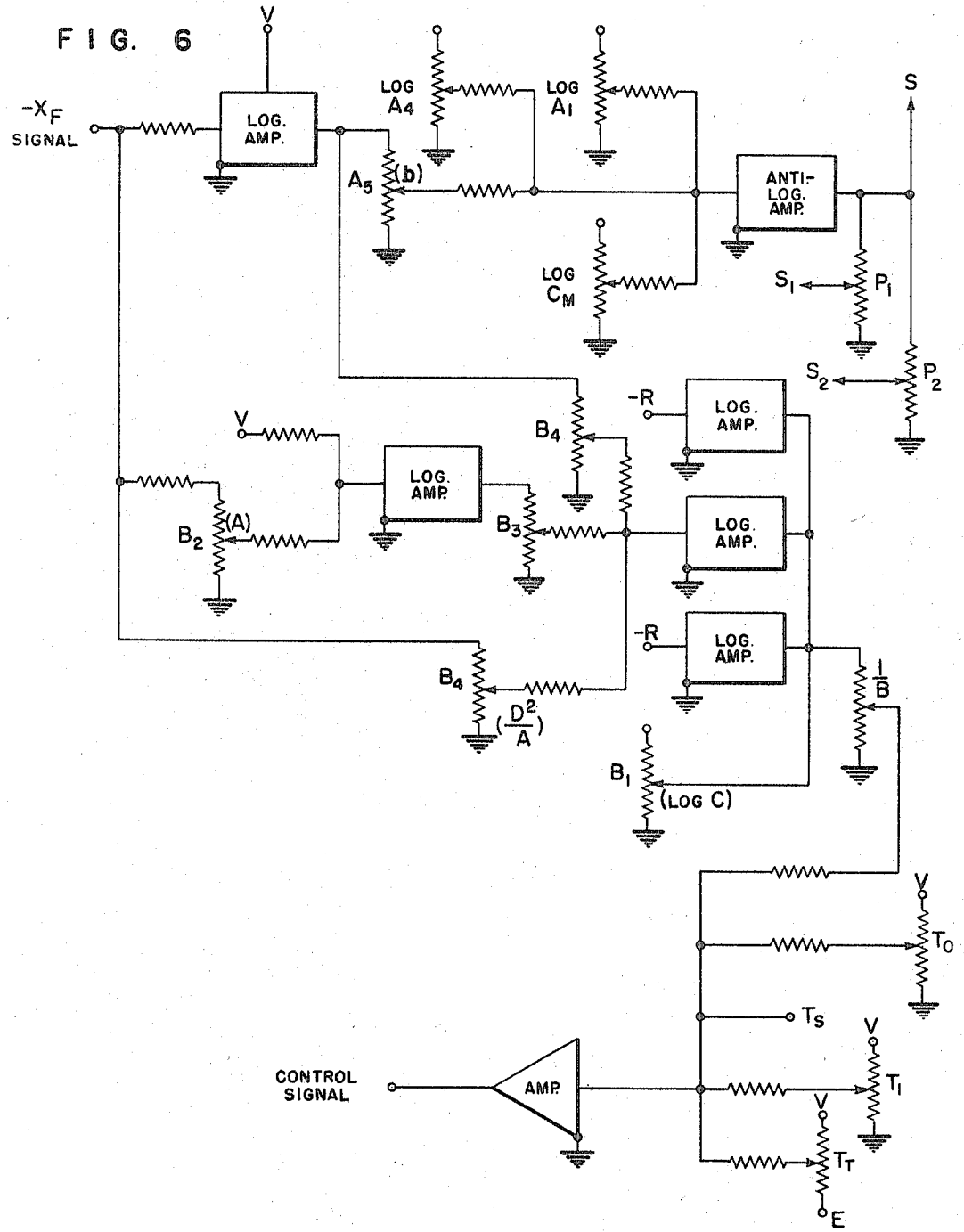

FIG. 6 is a simplified schematic of the circuit used to solve Equations 4, 5, and 6 to produce a temperature control signal. The designations in this figure refer to the potentiometers on the front panel as well as outputs from the other computing circuits. The other computing circuits have not been shown in detail since they are well-known analog computer circuits which in some cases, as the circuit for cooking travel time, are simply potentiometers representing the input signals with operational amplifiers summing the subdivided signals.

The operation of the computer control system is as follows:

After the power is turned on, the clock 30 is set to the correct time by means of push-buttons 31. To switch from a local control of the set-point for the heating zone, the local to manual set-point button is depresed and the set-point potentiometer 33 is adjusted until it reads zero. The control can now be transferred from local to computer control at the local control station for the digester. The potentiometers 50 for A coefficients are set for the type of wood presently in the digester. The current operating condiitons for the digester are set into the first level potentiometer of production rate 47, alkali ratio 48, K number 46 and chip meter 49. Further the potentiometers 45 for top temperature and upper heating zone temperature are set for the existing conditions. The temperature tracking button 38 is then pushed and the tracking potentiometer 40 is adjusted until the meter 33 reads a zero error. The computer is now tracking the digester and is available for programming changes in a future digester operation.

For a future change in the digester operation, the lower, or second, potentiometers for the future digester conditions are adjusted to the desired levels. Thus, potentiometers 46, 47, and 48 are adjusted to the new value. The program timer 32 is adjusted to the new time desired for a production change. The value of the chip feed 49 is read on the meter 34 by depressing the $S_2$ buttons 37. The lower potentiometer of group 49 is then adjusted to this value. The test button of the buttons 54 is depressed to check whether the program can be accomplished at the time desired. A green light provided for an acceptable program and a red light for an unacceptable program. In the case of an unacceptable program, the timer 32 can be advanced to a later time until an acceptable program is reached. The acceptable program is activated by the set button of buttons 54. The program can be cancelled by pressing the reset button of buttons 54. With the program proceeding, the computer will start to change the set-point temperature at the time started by the internal timing circuits. Further, the lights of group 52 will light in succession to indicate that the settings on the respective potentiometers should be applied to the affected equipment since the computed set-point is based on the settings. Finally, the program running light 53 will be lit to indicate that the new operation of the digester has been effected.

Accordingly, it may be seen that there has been provided, in accordance with the present invention, a programmed analog computer for providing automatic control of a continuous digester process system with an economic and predetermined mode of operation.

1. A continuous digester process system for cellulosic chips comprising a digester having an input for receiving material to be digested and digesting liquor and an output for continuously delivering digested pulp, a heat exchange apparatus for heating and circulating said digesting liquor, a temperature controller operative to control said heat exchange apparatus to produce a desired temperature of circulated liquor in response to a temperature set-point signal, and controller means operative to compute a set-point signal for said controller and operating with input signals corresponding to the desired digester operating characteristics, timing means for indicating an operation duration and supplying such indication as an input signal to said controller means, delignification indicating means supplying an input signal to said controller means, and means for supplying a signal indicative of a permanganate number of said cellulosic chips as an input signal to said controller means.

2. A pulp digesting system comprising, a pulp digester, means for supplying pulp to said digester, means for supplying a solution to said digester for mixing with said pulp, and controlling means for controlling the operation of said digester, said controlling means comprising timing means for timing the operation of said digester and computing the duration of the cooking of said pulp and solution mixture, means for detecting the delignification of said mixture in said digester, means for operating upon information supplied thereto by said timing means and said delignification detecting means to compute a desired temperature for said cooking of said mixture, and means for supplying information indicative of said desired temperature to said digester to control the temperature thereof.

3. A pulp digesting system comprising, a pulp digester, means for supplying a first type of pulp to said digester, means for supplying a second type of pulp to said digester at a different time, means for supplying a cooking solution to said digester for mixing with said pulp, and controlling means for controlling the operation of said digester, said controlling means comprising timing means for timing the operation of said digester and computing the duration of the cooking of each said pulp and solution mixture, means for computing the delignification of each said mixture in said digester, means for operating upon information supplied by said timing means and said delignification computing means to compute a desired temperature for said cooking of said mixture, and means for supplying information indicative of said desired temperature to said digester to control the temperature thereof whereby proper digester operation is provided for different types of pulp having different characteristics.

4. The system recited in claim 3 wherein said controlling means further comprises separate means for inserting constant information relative to each type of pulp to be operated on by said digester, and switch means controlled by said timing means for changing the inputs to said controlling means when the pulp changes.

5. In a continuous digester system wherein cellulosic pulp and suitable solution are mixed in a digester, apparatus for controlling the operation of the digester comprising, clock means for indicating the length of time of the digestion operation, timer means for controlling the duration of individual portions of the digestion operation, said clock means and said timer means producing information indicative of the status of the apparatus relative to the digestion operation, means for indicating a preselected alkaline ratio for said solution, means for determining the percentage conversion of lignin of the mixture in said digester, temperature computing means for operating on said information produced by said alkaline ratio indicating means, said lignin conversion determining means, and said clock means to provide information indicative of a desired control temperature for the solution of said mixture.

6. The digester system recited in claim 5 wherein said system is operative to receive a plurality of different cellulosic pulps, said means for indicating said alkaline ration producing different indications for different ratio of alkaline in the solution for the different types of pulp, said means for determining the percentage conversion of a lignin providing different output information relative to the different types of pulp being digested, feed rate change means for indicating a different rate of supply of cellulosic pulp, said rates of supply being altered in accordance with the properties of the pulp, said feed rate change information being further supplied to said temperature computing means, and set-point control means connected to said temperature function means for indicating a desired temperature for the solution and pulp mixture whereby optimum operating characteristics of the digester are achieved.

References Cited
UNITED STATES PATENTS

| | | | |
|---|---|---|---|
| 2,359,714 | 10/1944 | McKay | 162—238 X |
| 2,395,357 | 2/1946 | Trawick | 162—238 X |
| 2,909,239 | 10/1959 | Bennett | 162—238 X |
| 2,922,475 | 1/1960 | Alexander | 162—252 |
| 3,012,927 | 12/1961 | Polleys | 162—238 X |
| 3,040,807 | 6/1962 | Chope | 162—252 |

DONALL H. SYLVESTER, *Primary Examiner.*

HOWARD R. CAINE, S. L. BASHORE,
*Assistant Examiners.*